(12) United States Patent
Maneshkarimi et al.

(10) Patent No.: US 12,233,691 B2
(45) Date of Patent: Feb. 25, 2025

(54) WINDSHIELD DEFROSTER FOR A VEHICLE

(71) Applicant: Bayerische Motoren Werke Aktiengesellschaft, Munich (DE)

(72) Inventors: Mahmoud-Reza Maneshkarimi, Olching (DE); Maximilian Sperling, Unterhaching (DE); Stefan Zemsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 186 days.

(21) Appl. No.: 17/432,387

(22) PCT Filed: Mar. 18, 2020

(86) PCT No.: PCT/EP2020/057391
§ 371 (c)(1),
(2) Date: Aug. 19, 2021

(87) PCT Pub. No.: WO2020/212056
PCT Pub. Date: Oct. 22, 2020

(65) Prior Publication Data
US 2022/0185073 A1 Jun. 16, 2022

(30) Foreign Application Priority Data
Apr. 17, 2019 (DE) ............. 10 2019 110 211.1

(51) Int. Cl.
*B60H 1/34* (2006.01)
*B60H 1/00* (2006.01)
(Continued)

(52) U.S. Cl.
CPC ....... *B60H 1/3407* (2013.01); *B60H 1/00035* (2013.01); *B60H 1/00564* (2013.01); *B60H 1/242* (2013.01); *B62D 25/142* (2013.01)

(58) Field of Classification Search
CPC .............. B60H 1/3407; B60H 1/00035; B60H 1/00564; B60H 1/242; B62D 25/142
(Continued)

(56) References Cited

U.S. PATENT DOCUMENTS 4,223,754 A 9/1980 Mizuno et al.
5,762,395 A 6/1998 Merrifield et al.
(Continued)

FOREIGN PATENT DOCUMENTS

CN 104340180 A 2/2015
CN 109383379 A 2/2019
(Continued)

OTHER PUBLICATIONS

International Search Report (PCT/ISA/210) issued in PCT Application No. PCT/EP2020/057391 dated Jul. 13, 2020 with English translation (six (6) pages).
(Continued)

*Primary Examiner* — Allen R. B. Schult
(74) *Attorney, Agent, or Firm* — Crowell & Moring LLP

(57) ABSTRACT

A vehicle has a windshield, a cladding element having a front surface, which faces the windshield, a rear surface, which faces away from the windshield, and a top surface, which is arranged between the front surface and the rear surface and is angled toward the front surface and rear surface. An airflow element has a wall element, a grille element and an air inlet. At least the front surface and the top surface of the cladding element have a recess in which the wall element and the grille element are arranged. The grille element is designed to direct air from the airflow element to the windshield.

15 Claims, 2 Drawing Sheets

(51) Int. Cl.
  *B60H 1/24* (2006.01)
  *B62D 25/14* (2006.01)
(58) Field of Classification Search
  USPC .......................................................... 454/127
  See application file for complete search history.

(56) References Cited

U.S. PATENT DOCUMENTS

| | | | | |
|---|---|---|---|---|
| 5,934,744 | A | * | 8/1999 | Jergens ................ B62D 25/145 |
| | | | | 296/72 |
| 6,601,902 | B1 | | 8/2003 | Rahmstorf et al. |
| 2018/0043752 | A1 | | 2/2018 | Motomura et al. |
| 2019/0045117 | A1 | | 2/2019 | Maranville et al. |

FOREIGN PATENT DOCUMENTS

| | | |
|---|---|---|
| DE | 10 2013 010 637 A1 | 3/2014 |
| DE | 11 2016 001 119 T5 | 11/2017 |
| JP | 56-4929 U | 1/1981 |
| JP | 9-39610 A | 2/1997 |
| JP | 3714997 B2 * | 11/2005 |
| JP | 2015020689 A * | 2/2015 |
| WO | WO 97/49599 A1 | 12/1997 |

OTHER PUBLICATIONS

German-language Written Opinion (PCT/ISA/237) issued in PCT Application No. PCT/EP2020/057391 dated Jul. 13, 2020 (three (3) pages).

German-language Search Report issued in German Application No. 10 2019 110 211.1 dated Jan. 20, 2020 with partial English translation (12 pages).

English translation of Chinese-language Office Action issued in Chinese Application No. 202080017145.6 dated May 24, 2023 (6 pages).

* cited by examiner

WINDSHIELD DEFROSTER FOR A VEHICLE

BACKGROUND AND SUMMARY OF THE INVENTION

The present invention relates to a vehicle. The vehicle has in particular an improved windshield defroster. The vehicle is preferably a passenger motor vehicle.

It is known from the prior art that, in order to defrost a windshield, vehicles conduct hot air through a separate channel onto the windshield. A panel is attached at the location at which the air emerges from a dashboard of the vehicle. The panel is conventionally arranged in the viewing region of the occupants of the vehicle and leads to a reflection on the windshield, which leads to an unaesthetic impression and to a disturbing of the occupants, in particular the driver, of the vehicle. Air is also not optimally distributed on the windshield, and therefore a defrosting operation cannot proceed satisfactorily.

It is therefore the object of the invention to provide a vehicle which has an optimized system for defrosting the windshield. This object is achieved by the independent claim. The dependent claims contain preferred developments of the invention.

The object is achieved by a vehicle having a windshield, a covering element and an air-guiding element. The covering element is configured with a front surface which faces the windshield, a rear surface which faces away from the windshield, and a top surface. A spacing which can be filled with a filling material preferably remains between the front surface and the windshield. The top surface is arranged between the front surface and the rear surface and is angled with respect to the front surface and the rear surface. The top surface is particularly advantageously smaller in the vertical direction than in each case the front surface and/or rear surface in the vertical direction. The covering element thus preferably has a U-shaped or substantially U-shaped cross section. It is advantageously provided that the front surface is completely opposite the windshield. The covering element is particularly advantageously provided on a dashboard surface of the vehicle.

The air-guiding element has a wall element, a grille element, and an air supply. Via the air supply, the air-guiding element can be coupled to a ventilation system of the vehicle, for example to a conventional hot air shell. Air can thus pass out of the ventilation system via the air supply to the air-guiding element. For this purpose, it is advantageously provided that the air-guiding element can output the supplied air via the grille element. In particular, the wall element serves for conducting air from the air supply to the grille element. The grille element comprises air-conducting elements for adjusting a flow direction of the air flowing through the grille element.

At least the front surface and the top surface of the covering element have a recess. The wall element and the grille element are arranged in said recess. The grille element is designed here to conduct air from the air-guiding element onto the windshield. A defrosting functionality is thus ensured.

The advantage of such an arrangement is that the grille element can be configured to be delicate since stability of the air-guiding element is provided by the wall element. The wall element and the grille element here can be configured in two parts or multiple parts, with it being provided that the wall element and the grille element are assembled before the air-guiding element is installed in the recess of the covering element. The increased stability of the air-guiding element makes the installation in the recess of the covering element possible simply and reliably. At the same time, the grille element can be configured in such a manner that it has a large extent in a transverse direction y of the vehicle, as a result of which air can be guided to the windshield in a manner optimally distributed over the width of the windshield.

It is preferably provided that the front surface and the wall element form an elevation-free and/or depression-free surface. In particular a continuous surface is thus provided. In particular, the wall element fits seamlessly into the recess of the front surface.

The recess extends in the vertical direction z of the vehicle preferably over the entire front surface. In the longitudinal direction x of the vehicle, the recess preferably extends over at least part of the top surface, particularly preferably over at maximum one part of the top surface. This enables the grille element to be configured in narrow form in the longitudinal direction x while the wall element is maximized in the vertical direction z. By means of the wall element, firstly stability is thus provided for the grille element and, secondly, the air guidance achieved by the wall element within the air-guiding element from the air supply to the grille element is optimized since the wall element extends over the entire size of the covering element in the vertical direction z.

The wall element preferably covers the entire recess of the front surface. It is likewise preferably provided that the grille element covers the entire recess of the top surface. The covering element can thus be perceived as a continuous body. This in particular increases the stability of the covering element with the inserted air-guiding element.

The top surface is preferably opposite the grille element, in particular in a vertical direction z of the vehicle. The grille element is thus preferably recessed in the top surface. The grille element is therefore provided in a manner virtually invisible to occupants of the vehicle, and therefore the grille element does not have a disturbing effect in the field of view of the occupants.

The covering element preferably extends over an entire width between the A pillars of the vehicle. The effect achieved by this is firstly a visually high-value appearance and, secondly, the grille element obtains a greatest possible extent space in the transverse direction y of the vehicle.

The grille element preferably has a grille element width which is at least 50% of a maximum windshield width of the windshield. The effect achieved by this is that the air-guiding element can optimally distributed air over the entire width of the windshield. A reliable defroster functionality is thus provided.

The top surface of the covering element is preferably angled by an angle of at maximum 10° in relation to the horizontal. The top surface is particularly advantageously oriented horizontally. The front surface and the rear surface extend from the horizontal top surface downward with respect to the vertical direction z of the vehicle.

The vehicle preferably also has a dashboard surface. The dashboard surface adjoins the rear surface of the covering element. This means that the dashboard surface is visible only where it joins the rear surface. The covering element can be particularly advantageously provided on the dashboard surface such that part of the dashboard surface is concealed by the covering element and the dashboard surface is visible only where it joins the rear surface. Alternatively, the dashboard surface can also begin directly at the rear surface of the covering element. In particular, the dashboard surface is angled in relation to the rear surface. The dashboard surface, the rear surface and the top surface together form a step. Framing of the dashboard surface and separation of windshield and dashboard surface is thus achieved at least visually by the covering element.

The top surface is particularly advantageously arranged above the dashboard surface with respect to the vertical direction z of the vehicle. The previously described step is thus advantageously realized. The cover surface then advantageously serves as an outlet for the ventilation system of the vehicle since the grille element for conducting air onto the windshield is provided here.

Further details, features and advantages of embodiments of the invention emerge from the description below and the figures.

DETAILED DESCRIPTION OF THE DRAWINGS

Figure 1:
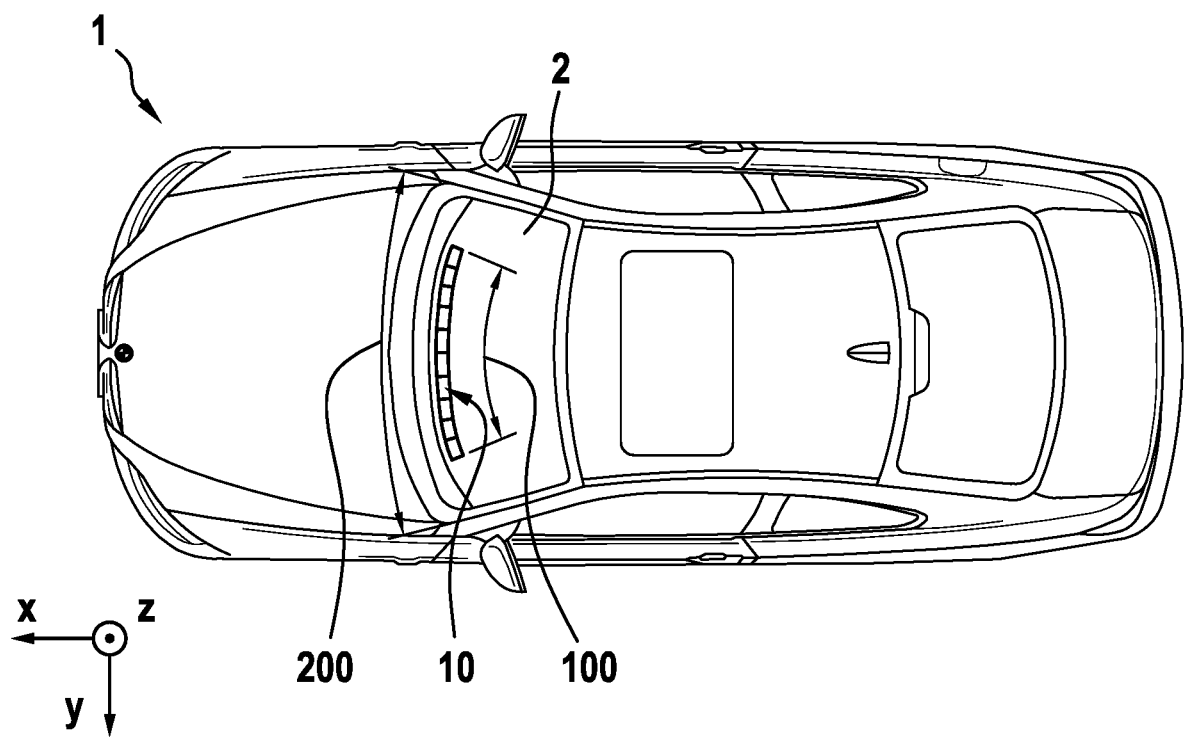
FIG. 1 shows schematically a vehicle according to an exemplary embodiment of the invention.

FIG. 1 shows schematically a vehicle 1 according to an exemplary embodiment of the invention. The vehicle 1 has a windshield 2 onto which an air flow can be directed. This serves in particular for defrosting the windshield 2. There is a grille element 10 for conducting the air flow onto the windshield 2. The grille element 10 has air-conducting elements which adjust a flow direction of the air flowing through the grille element 10. It is provided that the grille element 10 has a grille element width 100 which corresponds to at least 50% of a maximum windshield width 200 of the windshield. In particular, for this purpose, the corresponding dimensions of the windshield 2 and grille element 10 along the transverse direction y of the vehicle 1 are used.

Figure 2:
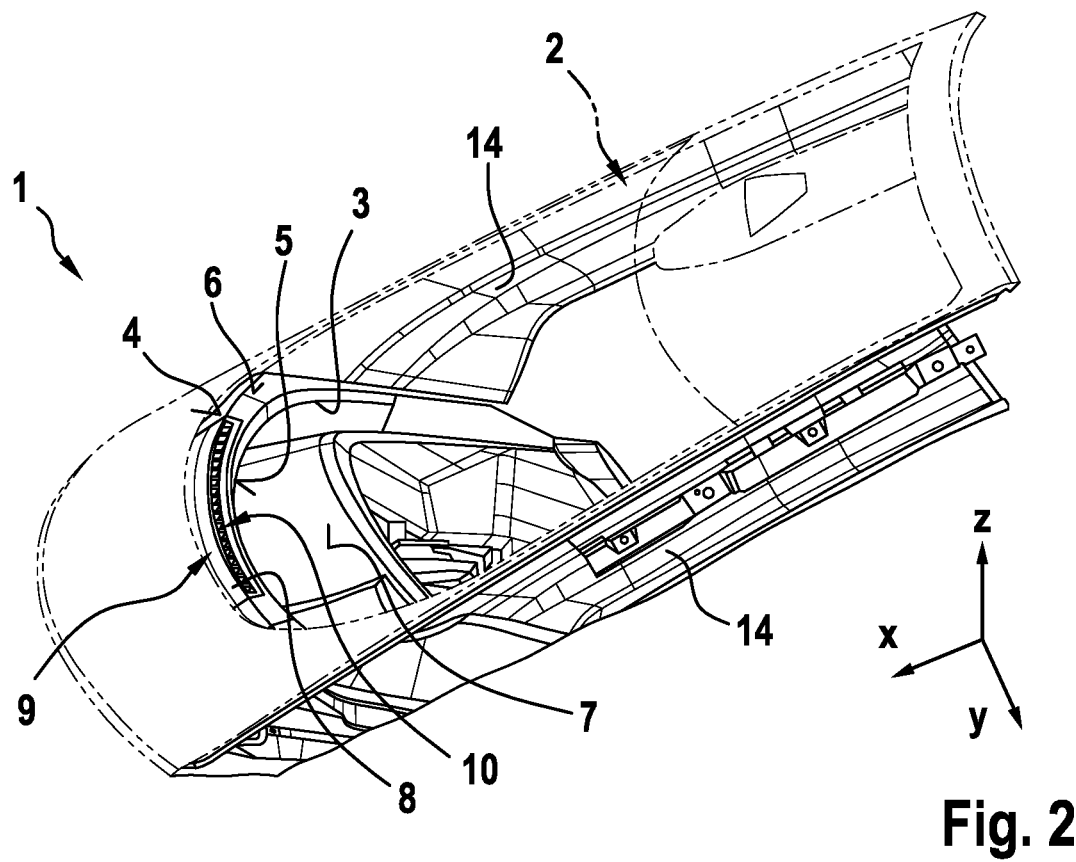
FIG. 2 shows schematically a partial region of the vehicle according to the exemplary embodiment of the invention.
Figure 3:
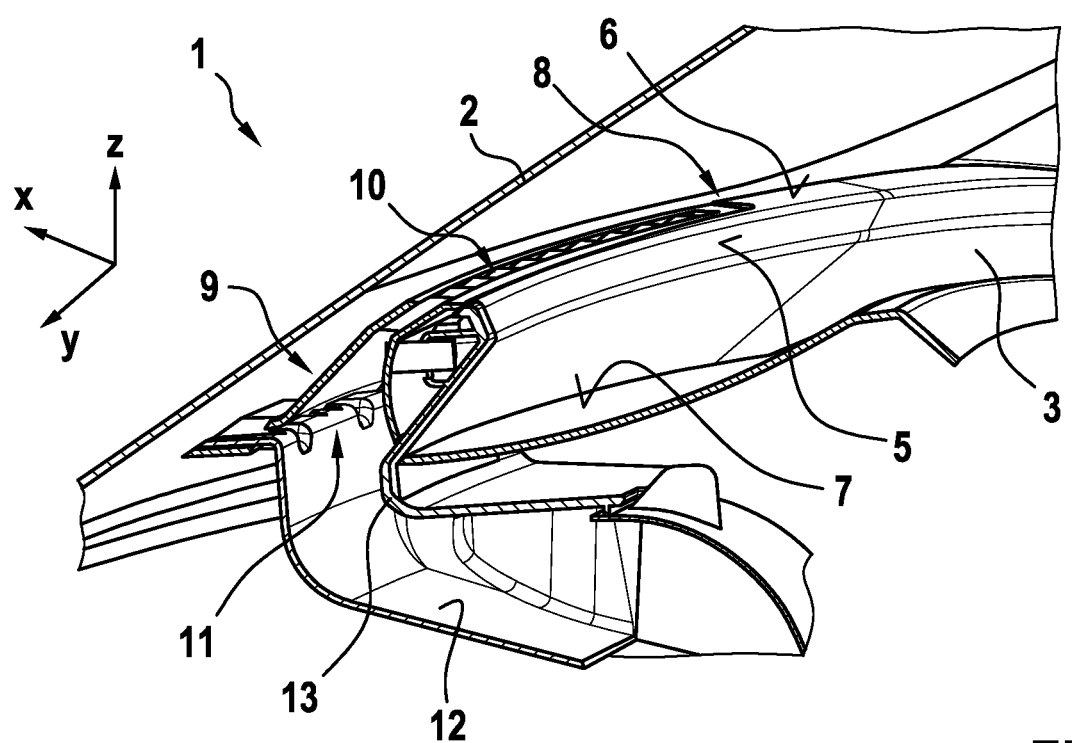
FIG. 3 shows schematically a sectional view of the partial region of the vehicle according to the exemplary embodiment of the invention.

FIG. 2 shows a detailed view of the vehicle 1, in particular of the region of the windshield 2. FIG. 3 shows a sectional view of this region. FIGS. 2 and 3 are described together below.

The vehicle has a covering element 3 which in turn comprises a front surface 4, a rear surface 5 and a top surface 6. The covering element extends preferably along the entire width in the transverse direction y of the vehicle 1 between the A pillars 14 of the vehicle 1. The front surface 4 faces the windshield 2 while the rear surface 5 faces away from the windshield 2. The top surface 6 is arranged between the front surface 4 and the rear surface 5 and is angled with respect to the front surface 4 and the rear surface 5. In particular, it is provided that the top surface 6 extends predominantly along the longitudinal direction x and transverse direction y of the vehicle 1. By contrast, the front surface 4 and the rear surface 5 extend predominantly along the vertical direction z and transverse direction y of the vehicle 1. This means in particular that the top surface 6 is smaller along the vertical direction z than the front surface 4 and/or rear surface 5. An inclination of the top surface 6 in relation to the horizontal plane is 10° at maximum. The front surface 4 with respect to its entire size in the vertical direction z of the vehicle 1 is preferably opposite the windshield 2. A spacing which is at least partially filled in particular with a filling element, for example foam, remains here between the windshield 2 and the front surface 4.

A dashboard surface 7 extends, adjoining the rear surface 5, in particular predominantly along the longitudinal direction x and transverse direction y of the vehicle 1. The dashboard surface 7 is angled in relation to the rear surface 5. This provides a step which is formed by the top surface 6, the rear surface 5 and the dashboard surface 7. This means that the dashboard surface 7 is arranged lower with respect to the vertical direction than the top surface 6. The covering element 3 thus forms a visual framing of the dashboard surface 7 and at least visually delimits the dashboard surface 7 from the windshield 2.

In order to enable the air to be directed onto the windshield 2, there is an air-guiding element 8. The latter is provided in a recess of the covering element 3 and has a wall element 9, which is arranged in a recess of the front surface 4, and the grille element 10, which is provided in a recess of the top surface 6. The grille element 10 and the wall element 9 are provided as a combined component in the covering element 3. This means that the air-guiding element 8, in particular the wall element 9 and the grille element 10, are formed integrally, or the air-guiding element 8 is assembled from a plurality of parts prior to being mounted in the covering element 3.

Owing to the fact that the wall element 9 and the grille element 10 can be installed as a combined component, the grille element 10 can be configured so as to be delicate. This is achieved in particular in that the grille element 10 is narrow with respect to the longitudinal direction x and is long with respect to the transverse direction y, in particular with the relative ratio with respect to the windshield 2 as described previously. By means of the combination of grille element 10 and wall element 9 as a unit to be installed, stability is provided even when the grille element 10 is configured to be delicate. The grille element 10 can therefore be arranged invisibly, or virtually invisibly, to occupants of the vehicle 1. The described size of the grille element 10, in particular in the transverse direction y, also ensures an optimum distribution of air on the windshield 2. Defrosting can thus take place in an optimum way.

The grille element 10 is particularly advantageously recessed in the top surface 6, i.e. the top surface protrudes in relation to the grille element 10, in particular in the vertical direction z. The effect achieved by this is that the grille element 10 is provided inconspicuously and cannot be perceived, or virtually cannot be perceived, by occupants of the vehicle 1.

The wall element 9 and the grille element 10 completely fill the corresponding recesses of the front surface 4 and the rear surface 5. The recess of the front surface 4 extends in particular along the complete size of the front surface 4 along the vertical direction z. The wall element 9 and the front surface 4 here form a continuous surface without an elevation or depression. The wall element 9 thus fits seamlessly into the recess of the front surface 4.

The wall element 9 also serves for guiding the air within the air-guiding element 8. The air-guiding element 8 has an air supply 11 via which air, which can be directed via the grille element 10 onto the windshield 2, can be supplied via the air-guiding element 8. The air supply 11 can be connected in particular to a conventional hot air shell 12. In addition to the wall element 9, the air-guiding element 8 preferably has an additional wall element 13 which, together with the wall element 9, forms a shaft which extends from the air supply 11 to the grille element 10.

The air-guiding element 8 thus permits reliable defrosting of the windshield 2, in particular since the air is conducted in a manner distributed optimally to the windshield 2. At the same time, the grille element 10 is arranged invisibly or virtually invisibly to the occupants of the vehicle 1. In particular a visually high-value impression is thus imparted.

LIST OF REFERENCE SIGNS

1 Vehicle
2 Windshield
3 Covering element
4 Front surface
5 Rear surface
6 Top surface
7 Dashboard surface
8 Air-guiding element
9 Wall element
10 Grille element
11 Air supply
12 Hot air shell
13 Additional wall element
14 A pillar
100 Grille element width
200 Windshield width

What is claimed is:

1. A vehicle, comprising:
a windshield;
a covering element extending along an entire width in a transverse direction y of the vehicle between A pillars of the vehicle, the covering element comprising:
  a front surface which faces the windshield along the entire width in the transverse direction y of the vehicle 1 between the A pillars of the vehicle,
  a rear surface which faces away from the windshield, and
  a top surface which is arranged between the front surface and the rear surface and is angled with respect to the front surface and the rear surface; and
an air-guiding element with a wall element, a grille element disposed between the wall element and the covering element, and an air supply,
wherein:
  at least the front surface and the top surface of the covering element have a recess, in which the wall element and the grille element are arranged, and that extends in a vertical direction of the vehicle over the entire front surface and in a longitudinal direction of the vehicle over at least part of the top surface,
  the grille element is configured for conducting air from the air-guiding element onto the windshield, and
  the wall element is configured to fit seamlessly into the recess of the front surface.

2. The vehicle according to claim 1, wherein
the wall element covers the entire recess of the front surface and/or the grille element covers the entire recess of the top surface.

3. The vehicle according to claim 1, wherein
the top surface protrudes in relation to the grille element in a vertical direction of the vehicle.

4. The vehicle according to claim 1, wherein
the covering element extends over an entire width between A pillars of the vehicle.

5. The vehicle according to claim 1, wherein
a grille element width of the grille element is at least 50% of a maximum windshield width of the windshield.

6. The vehicle according to claim 1, wherein
the top surface of the covering element is angled by an angle of at maximum 10° in relation to horizontal.

7. The vehicle according to claim 1, further comprising:
a dashboard surface which adjoins the rear surface of the covering element and forms a step with the rear surface and the top surface.

8. The vehicle according to claim 7, wherein
the top surface is arranged above the dashboard surface with respect to a vertical direction of the vehicle.

9. The vehicle according to claim 1, wherein
the wall element covers the entire recess of the front surface and/or the grille element covers the entire recess of the top surface.

10. The vehicle according to claim 9, wherein
the top surface protrudes in relation to the grille element in the vertical direction of the vehicle.

11. The vehicle according to claim 10, wherein
the covering element extends over an entire width between A pillars of the vehicle.

12. The vehicle according to claim 11, wherein
a grille element width of the grille element is at least 50% of a maximum windshield width of the windshield.

13. The vehicle according to claim 12, wherein
the top surface of the covering element is angled by an angle of at maximum 10° in relation to horizontal.

14. The vehicle according to claim 13, further comprising:
a dashboard surface which adjoins the rear surface of the covering element and forms a step with the rear surface and the top surface.

15. The vehicle according to claim 14, wherein
the top surface is arranged above the dashboard surface with respect to the vertical direction of the vehicle.

\* \* \* \* \*